United States Patent [19]

Miller et al.

[11] 3,970,071

[45] July 20, 1976

[54] SURFACE HEATER AND DRYER

[76] Inventors: Russell A. Miller, 1412 W. Woodside Drive, Dunlap, Ill. 61525; Earl R. Schmidgall, 702 N. Cherry Lane, Peoria, Ill. 61604

[22] Filed: Nov. 14, 1974

[21] Appl. No.: 523,830

[52] U.S. Cl. ................. 126/271.1; 126/271.2 C; 126/271.2 A
[51] Int. Cl.² ................. E01C 11/24; E01H 5/10
[58] Field of Search ............ 126/271.1, 271.2 R, 126/271.2 A, 271.2 C, 271.3, 343.5 R, 343.5 A; 237/69; 37/12; 404/95; 431/248

[56] References Cited
UNITED STATES PATENTS

| 743,021 | 11/1903 | Nesmith et al. | 126/271.2 R |
|---|---|---|---|
| 1,384,943 | 7/1921 | Ferguson | 126/271.2 A |
| 1,520,956 | 12/1924 | Kusebauch | 110/162 |
| 1,681,104 | 8/1928 | Earnhart | 126/343.5 R |
| 1,722,843 | 7/1929 | Fasul | 126/271.1 |
| 2,060,516 | 11/1936 | McIntyre | 431/248 |
| 2,093,840 | 9/1937 | Kulczak | 126/271.2 A |
| 3,279,458 | 10/1966 | Moench | 431/347 |
| 3,291,118 | 12/1966 | Wilson | 126/271.2 C |
| 3,442,262 | 5/1969 | Porterfield et al. | 126/271 |
| 3,675,600 | 7/1972 | Jones | 110/8 A |
| 3,698,380 | 10/1972 | Cook | 126/271.2 A |
| 3,805,766 | 4/1974 | Hammon | 126/271.2 C |
| 3,840,321 | 10/1974 | Moench | 431/247 |
| 3,847,137 | 11/1974 | Lambertoni | 126/271.2 A |

FOREIGN PATENTS OR APPLICATIONS

| 922,249 | 3/1963 | United Kingdom | 126/271.2 A |

Primary Examiner—John J. Camby
Assistant Examiner—Henry C. Yuen
Attorney, Agent, or Firm—Shoemaker and Mattare, Ltd.

[57] ABSTRACT

A surface heater and dryer includes a housing having a skirt for concentrating heat over a large area of the surface and contains a heater and blower for forcing super heated air onto the surface. Mounting structure is connected to the housing for supporting the heater and dryer on a suitable vehicle and adjustments are provided to adjust the position of the heater and dryer to compensate for weight changes and surface variations. Controls are also provided to regulate the temperature and amount of air discharged from the skirt for use of the heater and dryer for diverse purposes requiring different temperatures, and a hot air recirculator and fuel vaporizer are provided with vanes arranged to control the same to further regulate the heat output of the heater and dryer. Also provided is an arrangement of multiple heater and dryer units and accompanying controls for effecting treatment of a correspondingly large surface area.

30 Claims, 14 Drawing Figures

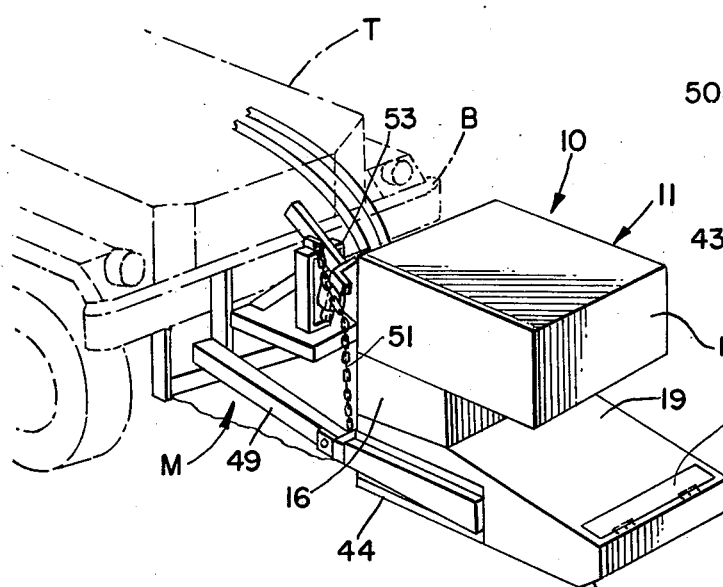
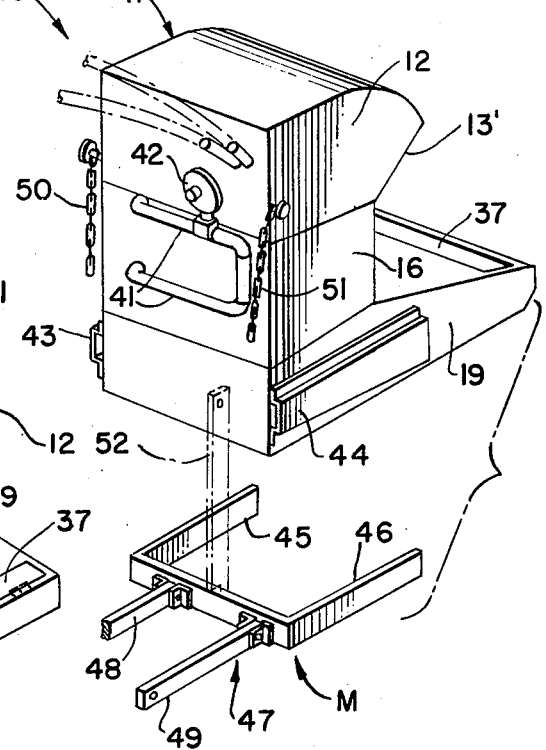
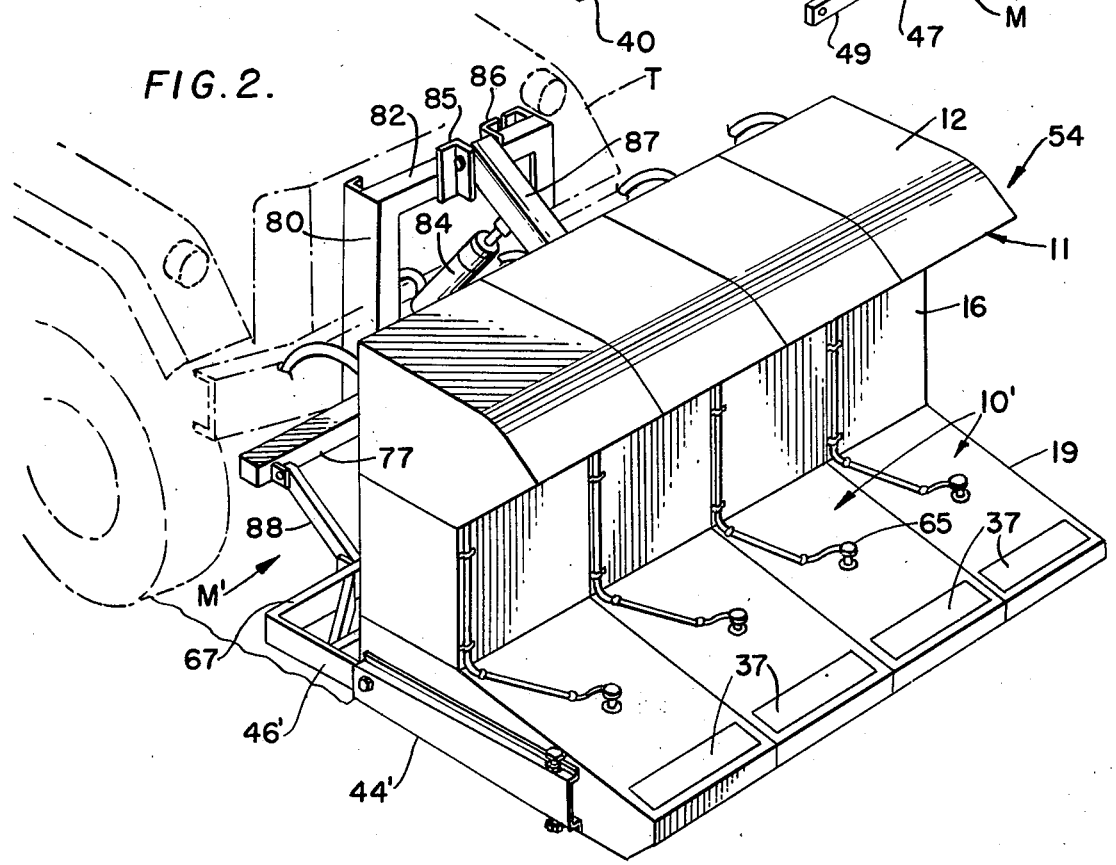

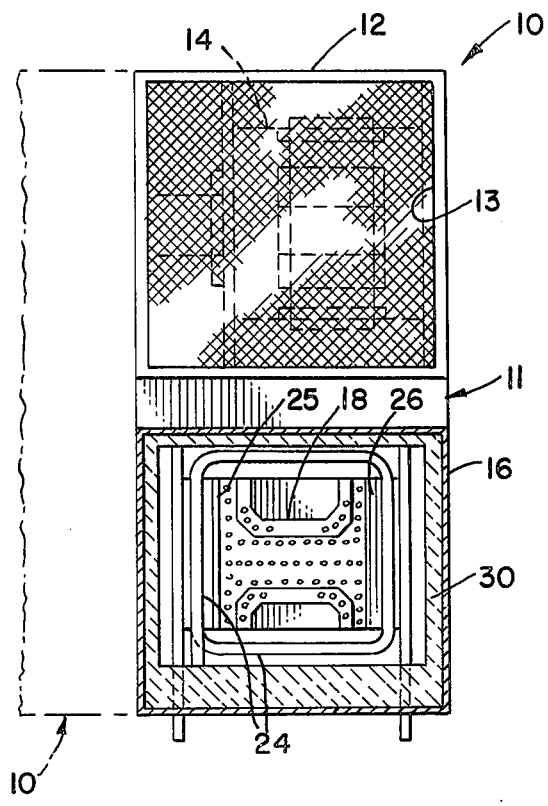
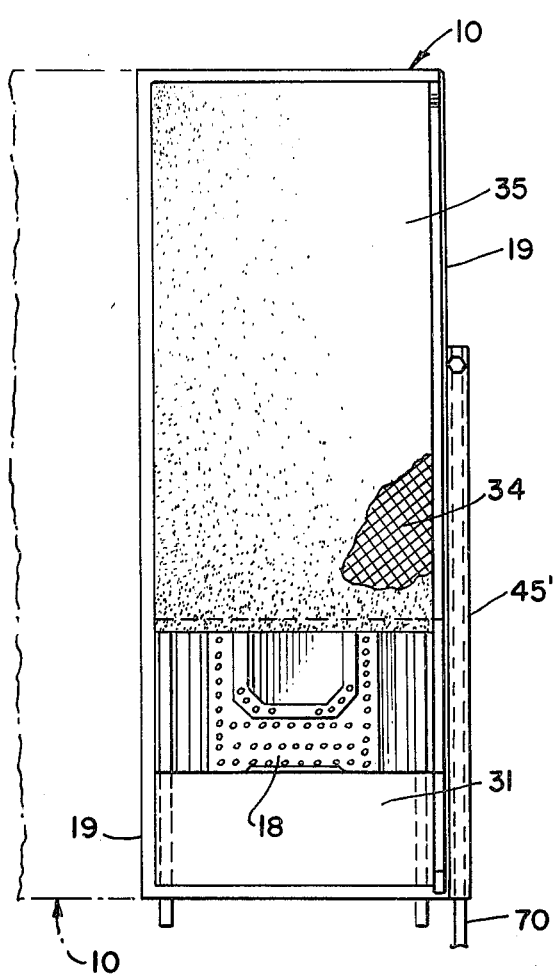
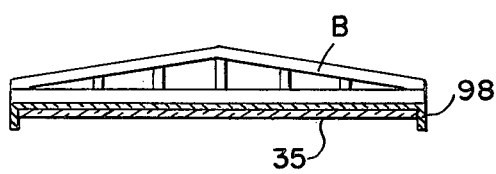
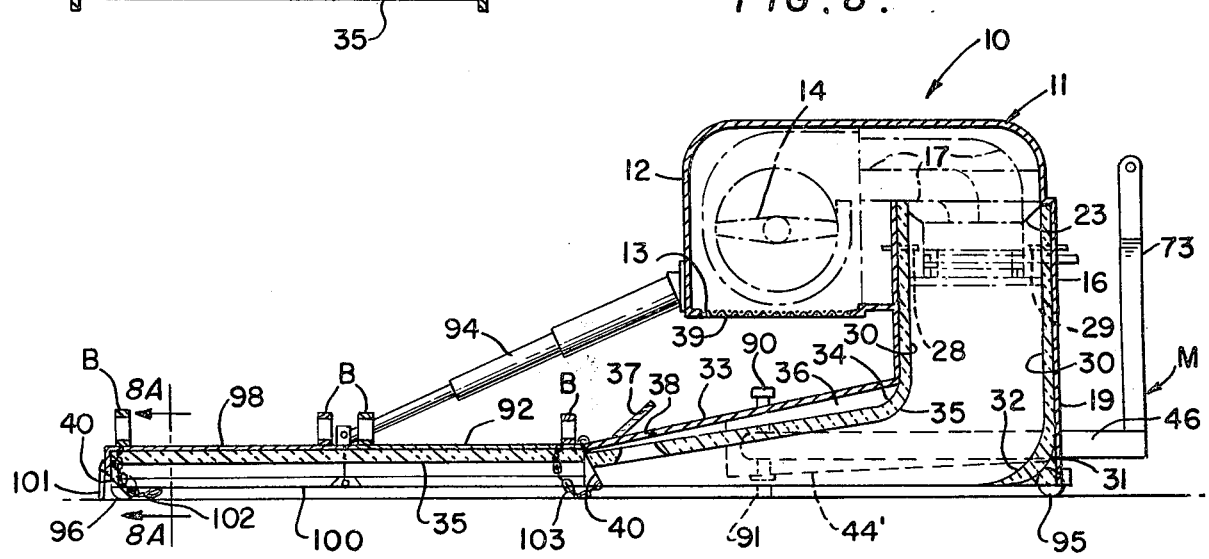

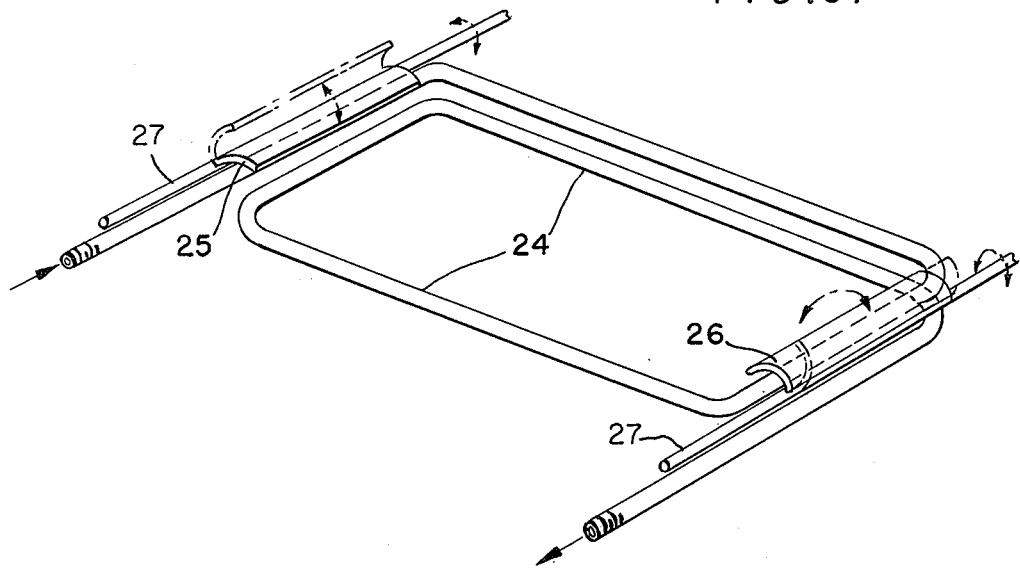
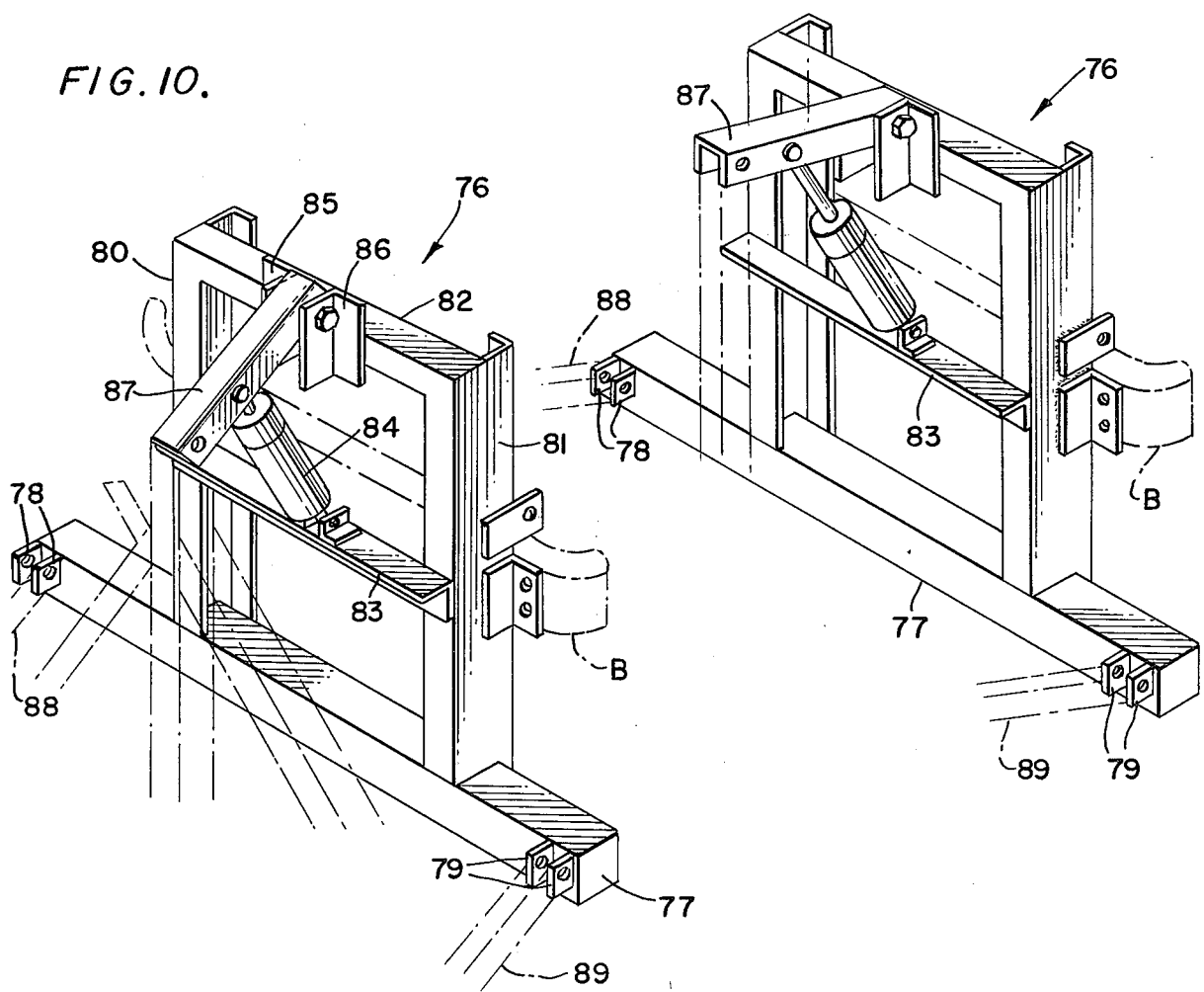

SURFACE HEATER AND DRYER

BACKGROUND OF THE INVENTION

This invention relates generally to surface heaters and dryers, and more particularly, to an apparatus for melting snow and ice. The apparatus also is useful in many other applications wherein heat is required.

Many different types of apparatus are known in the prior art for removal of snow and ice from ground surfaces and the like, and various types of prior art devices or apparatus utilize heat for melting snow and ice. However, such prior art devices are not wholly satisfactory due to the complexity of construction of some such devices and the corresponding expense in manufacturing them and in operating the devices to melt snow and ice, and further, such prior art devices either are not capable of heating and drying a large enough surface area at a time or must be operated at such a slow speed as to render them impractical and unsuitable for their intended use. Still further, such prior art devices are limited for use in the environment for which they are particularly designed, and they are not suitable for use in other applications wherein heat is required.

For example, some prior art devices have chambers lined with refractory material for retaining heat, while others have relatively small discharge areas for heat, and still others utilize such elements as electric resistance means or heat lamps and the like for producing the desired heat.

These devices are limited by their construction and design as to the amount of heat they are capable of producing, and further, in some prior art devices wherein flame is applied directly to the surface to be treated, they are not suitable for use except in very limited circumstances.

The provision of some economical, reliable structure for removing snow and ice from ground surfaces is highly desirable, since methods currently used are exceedingly expensive and damaging to the environment. For example, the most commonly used method of removing snow and ice from surfaces such as roadways, parking lots, airport runways and the like is to apply salt to the surface and/or to plow the surface with large, expensive snow plows and blowers. The use of salt is not only very expensive, being in the neighborhood of about $25.00 to $30.00 per mile per application, but is also not very effective in removing snow and ice, since frequently the salt is applied during hours of darkness and substantial melting of the snow and ice does not occur until the sun shines on the surface the following day. Moreover, the salt applied to the surface is destructive to the surface itself, and results in considerable flaking and breaking up of road surfaces during the winter months, and also damages or destroys vegetation adjacent the surface, and the salt even finds its way into water supplies and the like.

Prior art devices of the type which utilize heat to melt the snow and ice are not capable of generating sufficient heat to effectively remove the snow and ice, as pointed out above, and are, therefore, not suitable for removing snow and ice from highways or airport runways and the like, where large areas must be cleaned in relatively short periods of time.

Accordingly, the application of salt to the surface and the use of snow plows and blowers are almost universally relied upon, notwithstanding the recognized drawbacks and deficiencies. For example, snow plows and blowers do not remove all of the snow and ice from a surface, and a thin layer of ¼ to ½ inch or more of snow and ice is left on a surface after a snow plow or blower is used thereon.

The present invention not only solves the above problems very effectively and economically, but also solves other long standing problems in many other fields.

For example, in the construction industry, many millions of dollars and thousands of man hours have been lost, in addition to long construction delays, due to inclement weather conditions which require that construction on highways, buildings and the like be halted. As one example, in the construction of highways when asphalt is being laid the surface must be dry, and if even a small drizzle or light rain occurs and the surface is wetted, asphalt cannot be laid until the sun dries the surface. If this occurs when one or more trucks loaded with asphalt are on the way to the job site or are already at the job site, the asphalt cannot be laid on the wet surface and is generally disposed of at a great cost to the construction company, and ultimately to the public. With the present invention, the heater and dryer could be run along the surface and would thoroughly dry the surface, even during a light rain to permit the asphalt to be immediately laid down, or even in the event of a heavy rain, the dryer of the present invention could be run across the surface and would dry the surface in a matter of minutes, thereby enabling asphalt to be laid on the surface. Moreover, asphalt highways are generally constructed by first laying down a surface of asphalt and then placing oil on the surface and thereafter applying some sort of bonding material, such as sand and the like to the oil, after which another coat of blacktop or asphalt is laid. If the present invention is used, it can be run over the first layer of asphalt drawing oil to the surface and softening the first layer, thereby enabling a subsequent layer of asphalt or blacktop to be placed directly on the first layer without the use of a bonding material or the like.

Moreover, in the construction of buildings and the like, if a rain occurs access roads to the construction site become muddy and inaccessible to heavy equipment and trucks, such as concrete trucks and the like, and construction delays are experienced while waiting for the access roadways to dry. The heater and dryer according to the present invention can be driven over these access roads after heavy rainfalls and will dry and bake the access roads to a dry, hard condition in a matter of minutes, thus avoiding costly and time consuming construction delays.

Similar results can be achieved in the agricultural industry, wherein the heater and dryer according to the present invention can be run over fields to remove moisture therefrom and prepare them for harvesting of crops and the like, or the heater and dryer of the present invention can even be used to burn off weeds and insects and the like from field crops and is particularly applicable in the tobacco industry. Additionally, the present invention can be used to make fire breaks and the like.

Further, in the roofing industry construction personnel must wait until a roof surface is dry before applying various materials thereto. For example, a dew must be permitted to dry in the morning before the roof can be worked on, or in the winter months, frost, snow, rain and the like makes it impossible to work on a roof.

With the present invention, a small unit can be placed on a roof and run over the surface thereof to dry frost, snow, rain, dew or the like in a matter of minutes, thus enabling construction to proceed without delay.

Still further, in citrus groves and the like crop growers use smudge pots and the like to warm the temperature of the air to prevent freezing and damaging of crops, and these smudge pots are only partially effective, whereas with the present invention a heater and dryer can be run up and down the rows of citrus trees or the like, discharging heated air and thereby effectively warming the atmosphere to prevent damage to the crops.

Still further, blacktop roads experience what is known as dry rot, wherein the oil in the material of the road settles and the surface becomes crumbly and dry. A heater and dryer in accordance with the present invention can be run over such blacktop roads, and the heat will bring the oil back to the surface and restore the roadway to a like new condition.

Similar results are obtained on concrete airport runways having expansion joints therein. Such runways in the past have been subject to damage due to moisture entering the expansion joints and then freezing and forcing the tar and the like in the joints to the surface where it is broken up, and large amounts of money must be expended to restore or replace these expansion joints. With the present invention the heater and dryer can be run across such runways, particularly at the expansion joints, and the temperature or heat will soften the tar in the expansion joints and cause it to flow into the joints, restoring them to a condition at least as good as new, and in some cases even better than the joints as originally applied.

Other uses of the invention are in sports, wherein the heater and dryer could be run over playing fields to dry them and prepare them for the performance of an athletic event thereon, or on race tracks, whether they be for horse racing or automobile racing, to dry and prepare the surface.

In use, the device of the present invention not only melts the snow and ice, but evaporates the moisture, leaving the surface dry. This result also makes the device very effective in evaporating moisture and drying the surface after a rainfall, or where the surface has been wetted due to other causes.

Also, the design of the device is such that heated saturated air is discharged, thus utilizing the device with maximum efficiency. Further, a suitable hydrocarbon fuel is used in the device, such as gasoline, diesel fuel, propane or butane, and the like. In a preferred embodiment, propane is used.

Accordingly, the present invention not only has great utility as a snow melter and dryer, wherein savings of up to 99% can be realized, but also has great usefulness in many other applications, such as those enumerated above.

OBJECTS OF THE INVENTION

An object of this invention is to provide a surface heater and dryer which is economical in construction and is economical to use.

Another object of the invention is to provide a surface heater and dryer which uses an economical fuel and which can be used to heat or prepare many different types of surfaces in many diverse applications.

A more specific object of the invention is to provide a surface heater and dryer which includes a housing having a propane burner therein and a blower for forcing air through the burner and through a hood or skirt for concentrating the heated air over a large surface area.

A still further object of the invention is to provide a surface heater and dryer as above, wherein heated air is forced outwardly and forwardly of the hood or skirt for melting snow and ice in advance of the heater and dryer and wherein the surface beneath the heater and dryer is dried as the heater and dryer advances over the melted snow and ice.

BRIEF DESCRIPTION OF THE DRAWINGS

FIG. 1 is a front perspective view of a single heater and dryer unit according to a first form of the invention, shown in position on the front end of a truck.

FIG. 2 is a front perspective view similar to FIG. 1 of a plurality of single units according to a second form of the invention connected together in side-by-side relationship.

FIG. 3 is a rear perspective view of one of the units of FIG. 2.

FIG. 6 is a view in section taken along line 6—6 in FIG. 5.

FIG. 7 is a view taken along line 7—7 in FIG. 5.

FIG. 8 is a longitudinal, vertical, sectional view of the heater and dryer of FIG. 5.

FIG. 8A is a sectional view taken along line 8A—8A of FIG. 8, showing the brace member for the extensions.

FIG. 9 is a perspective view of the vaporizer tubes and control vanes therefor as used in the device herein.

FIG. 10 is a perspective view of that portion of the mounting structure for the heater and dryer which mounts to the front of a truck or other vehicle, and showing the hydraulic ram thereof in a lowered position.

FIG. 11 is a view similar to FIG. 10, with the hydraulic ram in an extended position to elevate the heater and dryer carried thereby.

DETAILED DESCRIPTION OF THE INVENTION

Figure 5:
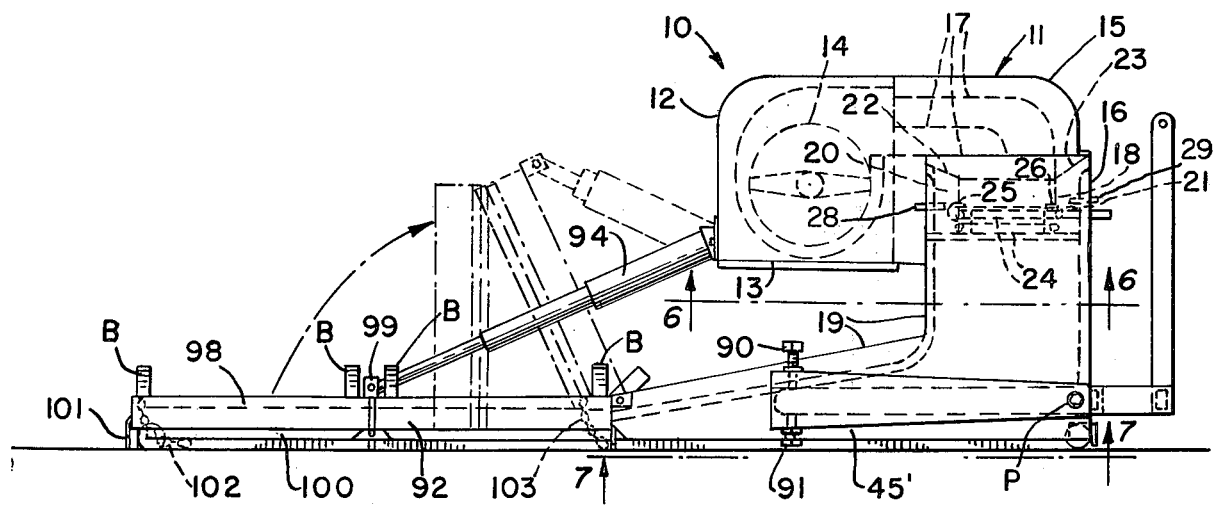
FIG. 5 is a somewhat diagrammatic view in elevation of a unit such as shown in FIG. 1, and with a plurality of hood extensions on the front thereof.
Figure 12:
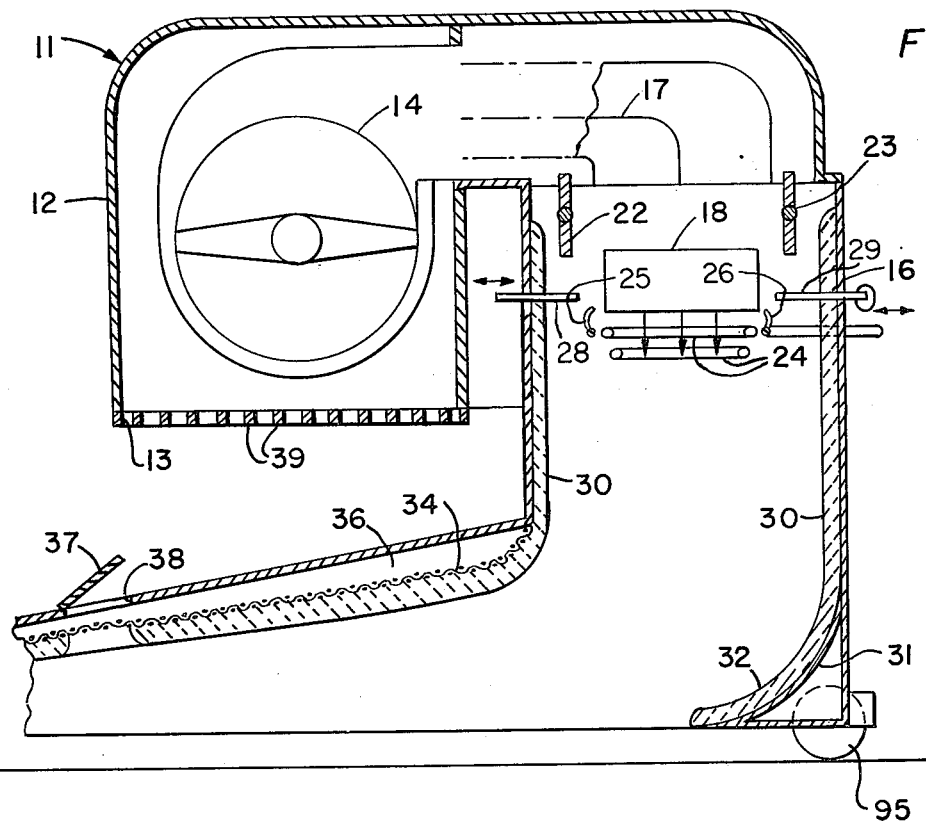
FIG. 12 is an enlarged, fragmentary, sectional view of a portion of the apparatus, showing the arrangement of blower, control vanes, and burner.
Figure 13:
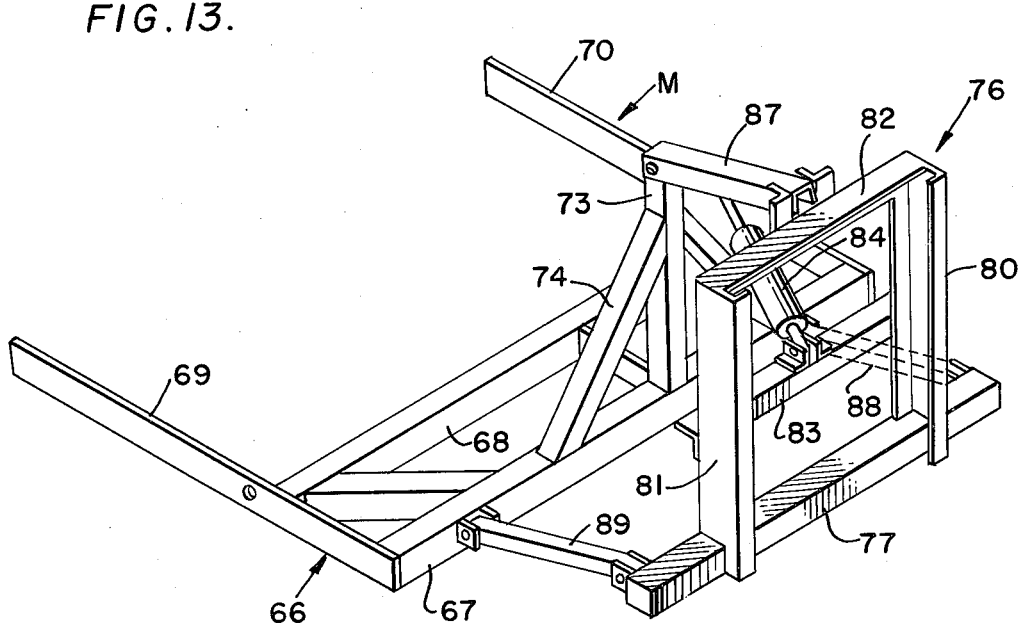
FIG. 13 is a perspective view of the mounting structure for the heater and dryer of the invention.

In the drawings, wherein like reference numerals indicate like parts throughout the several views, a first and preferred form of heater and dryer unit 10 in accordance with the invention is shown in FIG. 1 mounted to the front of a suitable vehicle, such as a truck T or the like, by means of suitable, articulated mounting means or structure M. Referring also to FIGS. 5–8 and 12, details of construction of the preferred form of the invention are clearly seen. The heater and dryer unit 10 comprises a housing 11 of sheet metal or other suitable, sufficiently rigid sheet material, having an upwardly and forwardly disposed intake portion 12 with an inlet opening 13 through the bottom thereof for intake of ambient air. A suitable blower means 14, preferably of the centrifugal type and one suitable example of which is available from Loren Cook Company of Canada, Catalogue No. 15M17D, having a capacity of 2,750 or more cubic feet per minute, is used to draw air in through inlet 13 and force the air through an intermediate duct portion 15 and into a heater portion 16. The blower operates at a substantially constant velocity and power for the blower motors is furnished by either an engine driven hydraulic pump or an electric generator carried by the propelling vehicle. The duct portion 15 has a plurality of guide vanes 17 therein for guiding the air discharged from the blower 14 smoothly and efficiently around the bend in the duct portion 15 to direct the air over a suitable heater 18 mounted within the heater portion 16 of the housing. The heater 18 is preferably of the type which burns propane and one suitable model thereof is a TAH Burner, Catalogue No. 320TAH by Eclipse Inc. of Rockford, Illinois. This burner is a low pressure burner and has a capacity of 3,200,000 BTU per hour, and air heated thereby is discharged into a shroud or hood portion 19 of the housing. The burners are ignited and controlled from an electronic control panel in the cab of the propelling vehicle, and this panel (not shown) monitors and provides a safety control over the burners. The burners are operated from 110V power from an engine driven generator of the propelling vehicle. The heater 18 is of a smaller cross-sectional configuration than the heater section 16 of the housing, and air bypass passages 20 and 21 are thus provided at opposite sides of the heater 18. Suitable air bypass control vanes or directional vanes 22 and 23 are pivotally mounted at the entrance to the bypass passages 20 and 21 for controlling the amount of air passing through the burner 18 and thus for controlling the length of flame from the burner. Thus with the bypass vanes 22 and 23 closed, as shown in FIG. 5, for example, all of the air discharged from the blower 14 passes through the burner 18 and is heated thereby and the flame is at its maximum length, and if a lower temperature of the air discharged from the unit 10 and shorter flame is desired, the vanes 22 and 23 are pivoted to their open position, as seen in FIG. 12, so that a portion of the air discharged from blower 14 goes through the passages 20 and 21 in bypassing relationship to the heater 18. Any suitable control means, not shown, for effecting opening and closing of the vanes 22 and 23 may be provided, such as hydraulic, electrical or mechanical means.

For further controlling the degree to which the air is heated by the burner 18, a plurality of fuel vaporizing tubes 24 in the form of a loop are provided adjacent the discharge from the burner 18, and liquid fuel supplied from a suitable source carried in a tank on the truck T, for example, is vaporized by the heat from the burner 18 and then fed to the burner, thereby increasing the efficiency and temperature output of the burner. In order to control the degree of vaporization of the fuel and thus to control the temperature output of the burner, a plurality of vapor control vanes 25 and 26 are pivotally disposed adjacent the vaporizer tubes 24 for pivotal movement into a closed position in overlying relationship to the vaporizer tubes and to an open position pivoted away from the vaporizer tubes. In the closed position, the vapor control vanes 25 and 26 shield the vaporizer tubes from the heated air discharged from the burner, so that the liquid fuel is not heated and vaporized to the same extent as it is when the vanes 25 and 26 are open, thus permitting the heated air from the burner to pass over the vaporizer tubes. Any suitable means for controlling pivotal action of the vapor shields or vanes 25 and 25 may be provided, such as hydraulic, electrical or mechanical means (not shown). The vanes 25 and 26 are carried by elongate, pivotal rods 27 covered with suitable heat insulation to prevent warping of the rods when they are heated.

A pair of sliding profile plates 28 and 29 are provided at opposite sides of the burner housing portion 16, immediately below the burner 18 and above vanes 25 and 26.

With regard to the blowers and heaters, more than one unit of each can be used in each unit of the device, if desired, in order to obtain greater control of temperature and air flow.

The inside of the heater section 16 of the housing is lined with a suitable insulating material 30, preferably having a thickness of about 1¼ inches on all sides of the housing, and this insulation extends downwardly into the discharge hood or shroud 19. The insulation can be of any suitable type and thickness to withstand temperatures of from about 2600°F to about 3000°F. As seen in FIG. 8, a curved plate 31 is fixed in the lower rear portion of discharge housing 19, and the insulation 32 curves forwardly and downwardly in overlying relationship to the plate 31 to effect a smooth transition and discharge of air from the shroud. The curved plate 31 and other metal structure of the device in the lower rearmost section thereof is preferably made of stainless steel to withstand the high temperature in this area. Further, the discharge hood or shroud 19 extends forwardly below and beyond the intake portion 12 of the housing and has a downwardly and forwardly sloping upper wall 33. A suitable support for the insulation, such as a wire mesh screen 34 or the like, is supported in the housing in spaced relation below the upper wall 33, and insulation 35 is secured thereon and a dead air space 36 is defined between the screen 34 and wall 33. Thus, although the temperature may reach as much as 2300°F or more within the housing portion 19, the wall 33 is not hot to the touch. A recirculating damper or vane 37 is pivotally secured in the sloping upper wall 33 over an opening 38 therethrough, and is operated between its open and closed positions by any suitable means to control the recirculation of heated air through the opening 38 and to the intake opening 13 for the blower 14. A wire mesh screen 39 is secured over the opening 13 in the intake housing 12 for preventing entry of debris and the like into the blower 14. Heated air from the heater 18 is thus confined within the shroud 19 and is discharged through the open bottom thereof over a relatively large surface area, and the forward end of the shroud is open at 40 such that the heated air is also discharged in a forward direction from the shroud and in use, when the heater and dryer unit 10 is moved along a surface for melting snow and ice and the like, the heated air discharged through the forward end 40 melts the snow and ice in advance of the path of movement of the heater and dryer unit, and as the heater and dryer unit moves onto the area of melted snow and ice, the water therefrom is evaporated and dried by the heated air discharged beneath the shroud 19. Of course, circumstances may occur wherein the snow and/or ice is at a depth such that the forwardly discharged heated air will not melt all of it, and the balance of this snow and ice is, therefore, melted when the heater and dryer unit is positioned thereover during continued advancement of the unit along the surface. The amount of moisture left upon the surface can be controlled by the adjustment of forward speed or by varying the temperature from the burners. Further, melting and drying is accomplished by heated air and there is no contact of flame on the surface being treated.

A slightly modified heater and dryer unit 10' is illustrated in FIG. 3, and this form of the invention is substantially identical to that previously described, except that rather than having the air intake opening 13 thereof disposed horizontally, the air intake is angularly disposed at 13'. In all other respects, this form of the invention is identical to that previously described.

Also seen in this Figure is a portion of the control manifold 41 for supplying and controlling the flow of fuel to the burner 18, and a pressure regulator 42 is connected in the manifold for regulating the pressure of fuel supplied to the burner to a sufficiently low value, typically measured in ounces, for proper operation of the low pressure burner.

The mounting means M for mounting either of the units 10 or 10' to the front of a vehicle, such as truck T or the like, includes a pair of channels 43 and 44 secured to opposite sides of the shroud 19 and extending longitudinally thereof for receiving a pair of longitudinally extending arms 45 and 46 on a lift structure or carriage 47 secured to the vehicle T. A pair of links or bars 48 and 49 are pivotally connected to the arms 45 and 46 and extend rearwardly therefrom and are connected to a portion of the vehicle on which the unit is carried, and a pair of chains or similar means 50 and 51 are attached at one end to the housing 11 at an upper portion thereof and are extended rearwardly and connected to the vehicle to prevent forward tilting of the unit. If desired, a vertically extending post 52 may be fixedly connected with the cross-piece attached to the arms 45 and 46, and a hydraulic lift mechanism 53 connected therewith for raising and lowering the unit as desired.

Each of the units 10 and 10' is approximately 6 feet long from the front to the back thereof and 3 feet wide, and the unit 10 is approximately 4 feet high, whereas the unit 10' is slightly higher, due to the inclined air intake 13'. Moreover, with both of the units disclosed, the flame does not touch the surface, but extends not closer than about 1½ inches above the surface such as the ground or the like. In fact, looking at FIG. 12, when the device is operating to produce a temperature of about 2000°F, the length of flame is from about 24 to 28 inches, and the distance from the burner to the area at 32 must be on the order of 32 inches to prevent flame contact with the ground.

A plurality of the units 10' are assembled together in side-by-side relationship in FIG. 2 to form a unit or assembly 54 approximately 12 feet wide and 6 feet long. The individual units 10' comprising the multiple unit 54 are all substantially identically constructed, and are identical in construction and operation to the single units previously described, with the exception that channel members 44' and 45' are provided only on the outside edges of the endmost units in the assembly.

Figure 4:
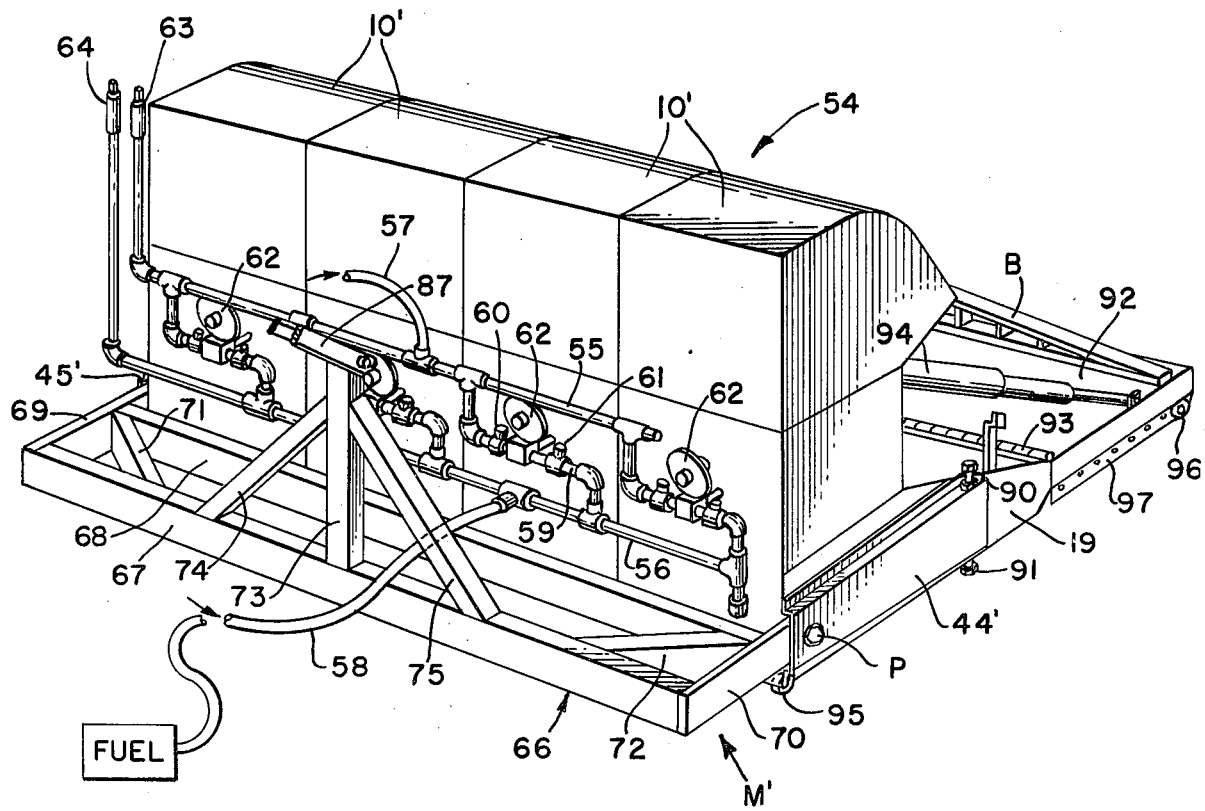
FIG. 4 is a rear perspective view of the multiple units of FIG. 2, and showing a portion of the mounting apparatus and fuel control means therefor.

Further, as seen in FIG. 4, fuel inlet manifolds 55 and 56 are connected with the backs of the units 10' in the assembly 54, and the upper manifold 55 is connected through a conduit 57 with a source of vaporized fuel, while the lower manifold 56 is connected through a conduit 58 with a source of liquid fuel. The vapor and liquid manifolds are connected by conduit means 59 having solenoid valves 60 and 61 therein for controlling the flow of vapor and liquid fuel, respectively, and a pressure regulator 62 is connected in pipe or conduit 59 between the valves and the respective burner to regulate the pressure of fuel supplied to the burner. Each of the manifolds is connected with a respective pop-off valve 63 and 64.

Further, as seen in FIG. 2, a temperature probe or thermostat 65 is connected through the upper wall 33 of each of the units 10'. When an assembly of units is provided as in this figure, if one of the three foot units fails to operate, the remaining units will continue to function, since they all are provided with separate controls, and the entire twelve foot assembly is thus not out of operation. Further, the heat from each burner is confined to its associated unit to prevent an excessive amount of heat buildup.

The mounting means M' for the multiple unit 54 comprises a yoke assembly 66 including a pair of spaced apart, parallel box beams or the like 67 and 68 having forwardly extending arms 69 and 70 connected across the opposite ends of the beams and extending forwardly for insertion into the channel members 44' and 45'. Diagonally extending braces 71 and 72 are connected between the box beams 67 and 78 to rigidify the structure. An upstanding post 73 is welded or otherwise suitably secured at its lower end on top of the rearmost box beam 67, and a pair of diagonal braces 74 and 75 are connected therewith for bracing the post.

A carriage or lift assembly 76 is mounted to the front of the vehicle, such as to the bumper B of the truck or the like, and includes a horizontally extending box beam 77 having pairs of spaced apart brackets or lugs 78 and 79 at the opposite ends thereof. A pair of spaced apart, upstanding, parallel channel members 80 and 81 are welded or otherwise suitably secured at their lower ends to the box beam 77, and a horizontally extending box beam or channel member 82 is welded or otherwise suitably affixed to the upper ends of the upstanding posts 80 and 81 and joins the upper ends thereof. A horizontally extending angle member 83 is welded or otherwise suitably affixed to the vertical posts 80 and 81 between the upper and lower ends thereof, and a hydraulic ram 84 is pivotally mounted at one end thereof on the angle member. A pair of angle brackets 85 and 86 are welded or otherwise suitably affixed to the horizontally extending member 82 and one end of a lift arm 87 is pivotally connected between the angle brackets. The ram 84 is connected at its other end to the lift arm 87 between the ends thereof, and the other end of the lift arm 87 is pivotally connected to the upper end of the upstanding post 73 of the yoke 66. A pair of forwardly extending arms 88 and 89 are pivotally connected between the brackets 78 and 79 on the box beam 77 and extend forwardly therefrom and are pivotally connected to the box beam 67 of the yoke 66. Thus, a parallelogram type linkage or connection is provided between the yoke and vehicle, whereby the assembly 54 of heater and dryer units 10' may be elevated and lowered relative to the surface. The arms 88 and 89 could comprise hydraulic rams if desired.

In order to adjust the angular position of the assembly 54 relative to the surface, the channel members 44' and 45' at opposite sides thereof increase in width toward the forward ends thereof, and a pair of adjustment bolts 90 and 91 are threaded from above and below the arms 69 and 70, respectively, into engagement therewith, and pivot bolts P are extended through the channel members near the rearmost ends thereof, whereby upon adjustment of the adjustment bolts 90 and 91 the assembly 54 is caused to tilt up or down about an axis extending adjacent the rear edge of the assembly and defined by the pivot bolts P, to thus compensate for changes in weight and for surface variations. For example, when a snow melting and/or drying operation is initiated, the supply of liquid propane on the truck may be full and after a period of time of operation of the burners, the amount of liquid propane is reduced, thereby reducing the weight on the truck, enabling the rear portion of the truck to rise, with the result that the assembly 54 is lowered relative to the surface. Thus, the adjustment bolts 90 and 91 provide a manual means for compensating for this effect, or hydraulic rams for automatic tilt can be used.

In FIG. 10, the ram 84 is shown in a collapsed condition and the assembly 54 would thus be lowered to adjacent the surface of the ground, and in FIG. 11 the ram is extended and the assembly 54 would thus be elevated from the ground for conveyance or travel of the assembly when the burners are not in use, or for applications wherein a higher elevation of the assembly relative to the ground is desired.

In FIG. 4, an extension or addition 92 is pivotally connected to the forward edge of the shroud 19 by means of a hinge or the like 93, and a hydraulic ram 94 is connected therewith for raising and lowering the extension 92. The extension is provided in situations, for example, wherein it is desired to concentrate the heat over a larger surface area. Further, suitable supporting elements, such as skids (not shown) or casters 95 and 96 or the like, are provided at the corners of the assembly in FIG. 4 for supporting it relative to a ground surface. Still further, an asbestos or other suitable heat resistant skirt 97 is secured to the extension 92 in depending relationship therefrom to aid in confining the heat to the area beneath the shroud and extension.

In FIG. 5, a still further extension 98 is pivotally connected to the forward edge of extension 92, and in this embodiment the ram 94 connects to a bracket 99 attached at the position shown in phantom line in FIG. 5. An asbestos or other suitable heat resistant skirt 100 is also fixed to extension 98, and a pivotal or flexible curtain 101 is affixed to the forward edge thereof. Chains or other suitable means 102 and 103 are secured to the underside of the extensions in a position to engage on the surface over which the assembly is being transported, such that in the event a heavy snowfall or a thick layer of ice is encountered, the chains, which will glow red hot, aid in breaking up the snow and ice to facilitate melting and drying thereof. In other words, when a heavy layer of snow or ice is encountered the heat tends to be reflected therefrom and the efficiency of the assembly is, accordingly, reduced. The chains break up the snow or ice and thus reduce or eliminate the reflective capabilities thereof, whereby the temperature or hot air from the assembly is effective to melt and dry the ice or snow.

The temperature in the extensions and beneath the main shroud 19 becomes progressively less as the distance is increased from the main shroud. For example, the temperature in the forwardmost extension 98 may be approximately 300°F, and the temperature in the middle or first extension 92 may be approximately 150°F less than the temperature beneath the main shroud 19. With two extensions attached to the front end of the units, as in FIGS. 5 or 8, the length of the assembly is approximately 12 feet and the width is approximately 12 feet. Thus, 144 square feet of surface area may be dried or otherwise treated at a time. To prevent heat warpage of the extensions, a brace B in the form of a bridge strut is welded or otherwise suitably fixed to the extensions at desired locations, as seen in FIG. 8A, for example.

Thus, a snow melter and dryer is provided in accordance with the teachings of the present invention which is exceptionally economical to operate and which is very simple and durable in construction, and which may be operated along a ground surface, such as a highway or airport runway or the like, to melt snow and ice therefrom, and under some conditions to dry the surface, depending upon the speed of operation and temperature of the heated air discharged from the device. For example, the device is most effective if operated immediately when a snowfall begins, and when the accumulation is an inch or less, the device effectively dries the surface and, in fact, the surface becomes slightly warmed, thereby delaying further accumulation of snow thereon. In fact, with the device as described an accumulation of snow of about 1 inch can be effectively melted from a surface, with a speed of operation of the device approaching 15 to 20 miles per hour. The efficiency and economy of operation of the device is due at least partly to the fact that there is less than a 1% heat loss.

Further, as set forth herein, the device has many other uses, and the savings in cost and time to municipalities, construction companies, airport operators and the like is evident. For example, a small 2 foot unit could be provided for use on sidewalks and the like. Further, the environmental advantages of the invention are significant.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A surface heater and dryer, comprising: a housing having an upper, air intake portion; an air heating portion connected to the air intake portion to receive air therefrom; and a lower, air discharge shroud portion, blower means mounted in the air intake portion for drawing atmospheric air into the housing and discharging it into the air heating portion; burner means mounted in the air heating portion for heating the air forced therethrough; air bypass vane means in the housing immediately adjacent the burner and located to be in operative relationship relative to that burner, such that when the vane means is closed, the air from the blower is forced through the burner, and when the vane means is open, a portion of the air is caused to flow in bypassing relationship to the burner; fuel vaporizer tubes connected to and between a source of liquid fuel and the burner and disposed between the burner and air discharge shroud portion, such that liquid fuel flowing through the vaporizer tubes is vaporized by the heat from the burner prior to the fuel being fed to the burner to thus increase the temperature output of the burner; movable vapor control means operatively associated with the vaporizer tubes and having a plurality of positions to control the passage of heated air over the tubes, whereby in one position thereof the amount of fuel vaporized is reduced, and in another position thereof the amount of vaporization of the fuel is increased; and said shroud portion including a forwardly extending portion extending beneath the air intake portion and having a forwardly facing air discharge opening and an open bottom, such that air heated by the burner is discharged both in a forward direction and in a downward direction against the surface to be heated and dried.

2. A surface heater and dryer as in claim 1, wherein the forwardly extending portion of the air discharge shroud portion includes an upper wall having a recirculating opening therein for recirculation of a portion of the heated air back through the housing.

3. A surface heater and dryer as in claim 1, wherein the blower means comprises a centrifugal blower.

4. A surface heater and dryer as in claim 1, wherein a plurality of heater and dryer units are connected together in side-by-side relationship.

5. A surface heater and dryer as in claim 1, wherein mounting means is provided on the heater and dryer for attaching the heater and dryer to a suitable vehicle for transporting the heater and dryer along the surface, said mounting structure including adjustment means for adjusting the elevation of the heater and dryer relative to the surface.

6. A surface heater and dryer as in claim 5, wherein the mounting means includes a pair of elongate channels at opposite sides of the heater and dryer assembly, and a pair of forwardly extending arms carried by the vehicle and extending forwardly into the channels for supporting the surface heater and dryer, and adjustment bolts engaged in the channels for engaging the forward ends of the arms, whereby upon adjustment of the adjustment bolts the angular position of the heater and dryer relative to the surface is adjusted.

7. A surface heater and dryer as in claim 1, wherein said vapor control means includes vapor control vane means pivotally mounted adjacent the vaporizer tubes and having a first position in overlying, closed relationship to the tubes to shield the tubes from heated air from the burner, such that the amount of fuel vaporized is reduced, and having an open position pivoted away from the vaporizer tubes, such that heated air from the burner passes over the tubes, to thus increase the amount of vaporization of the fuel.

8. A surface heater and dryer as in claim 1, wherein a recirculating opening is in an upper wall portion of the forwardly extending air discharge shroud adjacent the forward end thereof, and a recirculating damper is provided in operative relationship to the opening and is operable between open and closed positions relative to the opening to control the amount of heated air recirculated back to the intake and through the burner to thus increase the efficiency of operation of the device.

9. A surface heater and dryer as in claim 1, wherein a removable shroud extension is pivotally connected to the forward end of the air discharge shroud for enlarging the area of the surface over which heated air is discharged.

10. A surface heater and dryer as in claim 9, wherein a second extension is pivotally mounted to the forward end edge of the first shroud extension for even further enlarging the area of the surface over which heated air is discharged, and means connected with the first and second shroud extensions for pivoting the shroud extensions to an inoperative, upwardly folded position.

11. A surface heater and dryer as in claim 1, wherein means are connected to the shroud and depend therefrom into engagement with the surface beneath the shroud to engage and aid in breaking up snow and ice and the like as the heater and dryer passes thereover to thus reduce the reflective characteristics of heavy accumulations of snow and ice to aid the surface heater and dryer in melting and drying the snow and ice and the like.

12. A surface heater and dryer as in claim 1, wherein the forwardly extending portion of the air discharge shroud has an upper downwardly and forwardly sloping wall, said air discharge shroud of the device lined with an insulating material, and a recirculating opening in a forward upper portion of the upper wall of the shroud for recirculation of heated air back through the blower and burner to increase the temperature output and increase the efficiency of operation of the device.

13. A surface heater and dryer as in claim 12, wherein a suitable insulation support means, such as a wire mesh screen or the like, is connected to the upper wall of the shroud in downwardly spaced relation to an inner surface thereof, and the insulation is supported by the wire mesh screen, thus defining a dead air space between the upper wall and the insulation, so that the upper wall of the shroud is not hot to the touch during operation of the device.

14. A surface heater and dryer as in claim 1, wherein the air intake opening for the air intake portion of the housing is horizontally disposed and opens downwardly to the area above the forwardly extending portion of the air discharge shroud.

15. A surface heater and dryer as in claim 1, wherein the air intake opening of the air intake portion of the housing is angularly disposed and is downwardly and forwardly facing to the area over the forwardly extending portion of the air discharge shroud.

16. A surface heater and dryer as in claim 12, wherein a downwardly and forwardly curved plate is secured in the air discharge shroud portion of the housing at a lower rear edge thereof and the insulation is supported on said curved plate in a downwardly and forwardly curving position, such that the heated air is discharged in a downward and forward direction.

17. A surface heater and dryer as in claim 11, wherein said means depending into engagement with the ground comprises chains, the heated air from the burner heating the chains to a red hot condition, and the chains thus aiding in breaking up and melting snow and ice over which the heater and dryer is conveyed.

18. A surface heater and dryer as in claim 5, wherein the mounting means for the heater and dryer includes a mounting structure connected to a supporting vehicle and a yoke assembly connected to the surface heater and dryer, said mounting structure and yoke assembly being interconnected by pivotal links and a hydraulic ram engaged with the links to elevate and lower the links and thus the yoke assembly and heater and dryer carried thereby, said links comprising a parallelogram assembly such that the surface heater and dryer may be elevated and lowered while remaining parallel to the surface of the ground over which it is being conveyed.

19. A surface heater and dryer as in claim 1, wherein casters are on the heater and dryer at the lower corners thereof to support the heater and dryer on the surface.

20. A surface heater and dryer as in claim 1, wherein a depending asbestos or other suitable heat resistant skirt is fixed around the bottom edge portion of the air discharge shroud to aid in containing the heated air to the area of the surface beneath the shroud.

21. A surface heater and dryer as in claim 1, wherein the housing comprises sheet material with sufficient structural strength to withstand forces imposed thereon during use of the device.

22. A surface heater and dryer as in claim 1, wherein a plurality of movably mounted directional vane means are supported in the housing between the burner and the air intake portion for controlling the flow of heated air from the burner to and through the shroud.

23. A surface heater and dryer as in claim 22, wherein the burner has a smaller cross-sectional dimension than the cross-sectional dimension of the air heater portion of the housing, whereby air bypass passages are defined between the heater portion of the housing and the burner, and horizontally slidable vane means are supported by the housing in a position below the directional vane means and are movable between a closed position across the air bypass passage and to an open position out of the air bypass passage.

24. A surface heater and dryer as in claim 1, wherein an intermediate duct portion is between the air intake portion and air heating portion, and a plurality of arcuately curved guide vane means are supported in the intermediate duct portion of the housing for effecting a smooth and efficient flow of air from the blower to the heater.

25. A surface heater and dryer as in claim 1, wherein the heater and dryer has a width of about 3 feet, a length of about 6 feet and a height of about 4 feet.

26. A surface heater and dryer as in claim 1, wherein the burner has a rating of 3,200,000 BTU per hour.

27. A surface heater and dryer as in claim 1, further including a centrifugal blower having a capacity of about 2,750 or more feet per minute.

28. A surface heater and dryer as in claim 26, wherein control means are provided for regulating the temperature of heated air from about 200°F to about 2500°F.

29. A surface heater and dryer as in claim 1, wherein the housing includes an intermediate duct section between the air intake portion and air heating portion, and the air bypass vane means is provided in the housing between the intermediate duct section and the air heating portion to be in operative relationship relative to the burner, such that when the vane means is closed, the air from the blower is forced through the burner, and when the vane means is open, a portion of the air is caused to flow in bypassing relationship to the burner.

30. A surface heater and dryer, comprising: a housing having an upper, air intake portion; an air heating portion connected to the air intake portion to receive air therefrom; and a lower, air discharge shroud portion, blower means mounted in the air intake portion for drawing atmospheric air into the housing and discharging it into the air heating portion; burner means mounted in the air heating portion for heating the air forced therethrough; air bypass vane means in the housing adjacent the burner and located to be in operative relationship relative to that burner, such that when the vane means is closed, the air from the blower is forced through the burner, and when the vane means is open, a portion of the air is caused to flow in bypassing relationship to the burner; fuel vaporizer tubes connected to and between a source of liquid fuel and the burner and disposed between the burner and air discharge shroud portion, such that liquid fuel flowing through the vaporizer tubes is vaporized by the heat from the burner prior to the fuel being fed to the burner to thus increase the temperature output of the burner; movable vapor control means operatively associated with the vaporizer tubes and having a plurality of positions to control the passage of heated air over the tubes, whereby in one position thereof the amount of fuel vaporized is reduced, and in another position thereof the amount of vaporization of the fuel is increased; and said shroud portion including a forwardly extending portion beneath the air intake portion and having a forwardly facing air discharge opening and an open bottom, such that air heated by the burner is discharged both in a forward direction and in a downward direction against the surface to be heated and dried.

* * * * *